Patented June 12, 1951

2,556,636

UNITED STATES PATENT OFFICE 2,556,636

γ-SUBSTITUTED PROPYLAMINE TYPE ANTIHISTAMINES

Nathan Sperber, Bronx, and Domenick Papa, Brooklyn, N. Y., and Erwin Schwenk, Montclair, N. J., assignors to Schering Corporation, Bloomfield, N. J., a corporation of New Jersey No Drawing. Application June 23, 1948, Serial No. 34,848

11 Claims. (Cl. 260—247.1)

The invention relates to new substances of interesting and important physiological properties and more particularly to heterocyclic substituted aliphatic amines which have been found to be highly effective against histamine-induced allergic reactions and to methods of making the same.

It is recognized that the liberation of histamine into the tissues, which can be brought about by a multitude of agents or processes, is primarily responsible for many of the allergic manifestations in man. It has been found that certain substances of closely related chemical configurations are effective in alleviating the symptoms of many allergic reactions. The specificity of these chemical substances for the control of allergic reactions is well demonstrated by the researches carried on within the last ten years. However, although the substances prescribed at the present time represent a remarkable advance, they exhibit many undesirable side effects, or so-called toxic reactions, among which may be mentioned the high incidence of drowsiness, dizziness, nausea, gastro-intestinal irritation and dryness of the mouth.

It has been generally considered that only those substances which are derivatives of ethanolamine and ethylenediamine show pronounced anti-histaminic and anti-anaphylactic activity. We have now found that heterocyclic substituted aliphatic amines of the general formula

wherein X is an aliphatic chain containing from 3 to 5 carbon atoms, R is a heterocyclic nucleus, for example, pyrimidyl, thiazyl, thienyl, pyrazyl, furyl, quinolyl, s-triazyl, and 1,3,4-thiadiazyl, $R_1$ is a phenyl nucleus, and $R_2$ is a member of the group consisting of dialkylamino, morpholino and piperidino groups, and the salts thereof have a high degree of antihistaminic activity. The heterocyclic nucleus R and the phenyl nucleus $R_1$ may contain one or more substituents such as lower alkyl and lower alkoxy groups, hydroxyl and groups convertible thereto by hydrolysis, halogens, amino, alkylamino, acylamino, nitro, carboxy and carbalkoxy.

Clinical studies with representative members of the compounds of this invention have demonstrated extremely favorable anti-histaminic activity. This high order of activity is accompanied by relative freedom from side effects. Particularly important is the comparative absence of any sedation, dizziness or depression in more than 90% of the cases treated. This advantage is of extreme importance in the clinical application of anti-histaminic drugs.

Inclusion in the phenyl and heterocyclic nuclei of various substituents as hereinabove indicated does not alter the type of physiological response which one obtains with the compounds. However, certain substituents increase or decrease slightly either the anti-histaminic activity or the toxicity of the compounds, or both, as compared with the parent compounds having no substituents in either the phenyl or the heterocyclic nuclei.

In general, the compounds of the invention may be made by the hydrolysis and decarboxylation of the corresponding nitriles. When the nitriles are treated with a strong acid, such as concentrated sulfuric acid or concentrated hydrohalic acids, the nitriles are hydrolysed and decarboxylated to the compounds of the invention.

The following specific examples are illustrative of the methods and products of the invention:

EXAMPLE I

γ-Phenyl-γ-(2-pyrimidyl)-N,N-dimethylpropylamine

*Preparation of 2-chloropyrimidine.*—To a stirred solution of 114 g. of 2-aminopyrimidine and 600 cc. of concentrated hydrochloric acid is added a solution of 150 g. of sodium nitrite in 240 cc. of water over a period of 1½ hours, keeping the temperature at —10° C. The reaction mixture is allowed to come to room temperature and then is made alkaline with ammonia and ether extracted several times. The ether layer is dried over sodium sulfate, filtered and evaporated. The resulting oily residue crystallizes on cooling. Recrystallized from benzene-petroleum ether, M. P. 65.4–66.4° C.

*Preparation of γ-phenyl-γ-(2-pyrimidyl)-N,N-dimethylpropylamine.*—In a 500 cc., 3-necked flask equipped with a stirrer and condenser, 7 g. of sodium is converted to sodamide and the ammonia is replaced with 200 cc. of toluene. In a one liter, 3-necked flask equipped with a stirrer, condenser and dropping funnel are placed 31 g. of 2-chloropyrimidine, 47 g. of α-(β-N,N-dimethylaminoethyl) phenylacetonitrile and 300 cc. toluene. The solution is heated to 80–90° C. and the stirred sodamide suspension is added. The reaction is refluxed for 7 hrs. and then decomposed with water. The organic layer is separated and vacuum concentrated. The residue is dissolved in 300 g. of 80% sulfuric acid and heated with stirring for 3 hrs. at 130° C. The reaction mixture is poured on ice, made alkaline with ammonia and the resulting oil is ether extracted. The ether layer is dried over sodium sulfate, filtered and evaporated. The residue is fractionated, B. P. 125–130° C./0.5 mm.

EXAMPLE II

γ-phenyl-γ-(2-thiazyl)-N,N-dimethylpropylamine

*Preparation of α-(2-thiazyl)-α-(N,N-dimethylaminoethyl) phenylacetonitrile.*—In a 500 cc., 3-necked flask, 7 g. of sodium is converted to sodamide in the usual manner and the ammonia is replaced by 200 cc. of toluene. The sodamide suspension is added to a stirred solution of α-(β-N,N-dimethylaminoethyl) phenylacetonitrile (prepared by the alkylation of phenylacetonitrile with β-N,N-dimethylaminoethyl chloride) and 33 g. of 2-chlorothiazole in 300 cc. of toluene. The reaction mixture is refluxed for 11 hrs. after the addition of sodamide has been completed. The reaction mixture is decomposed with water and the organic layer is concentrated. The residue is fractionated, B. P. 153–159°C./1.5 mm.

*Preparation of γ-(phenyl)-γ-(2-thiazyl)-N,N-dimethylpropylamine.*—In a 500 cc. flask equipped with a stirrer, condenser and thermometer is placed 30 g. of α-(2-thiazyl)-α-(β-N,N-dimethylaminoethyl) phenylacetonitrile and 200 g. of 80% sulfuric acid. The solution is stirred and heated at 150–160° C. for one hour until the evolution of carbon dioxide has ceased. The reaction mixture is poured on ice, made alkaline with ammonia and the resulting oil is taken up in ether. The ether layer is dried over sodium sulfate, filtered and the ether evaporated. The residue is fractionated, B. P. 123–126°C./1.0 mm.

EXAMPLE III

γ-benzyl-γ-(2-thienyl)-N,N-dimethylpropylamine

The intermediate 2-thienylacetonitrile is obtained from 2-thienylmethyl chloride by reaction with potassium cyanide in aqueous ethanol. Alkylation of this nitrile with benzyl chloride and β-N,N-dimethylaminoethyl chloride is carried out essentially as described in the previous examples.

Removal of the CN group is accomplished by dissolving the nitrile in 3 parts of 70% sulfuric acid and heating the resulting mixture with stirring for about 3 hrs. at 120–135° C. The propylamine is isolated as described in the previous examples.

EXAMPLE IV

γ-Benzyl-γ-(2-thienyl)-N,N-diethylpropylamine

This substance is obtained in exactly the same manner as described in Example III except for the substitution of β-N,N-diethylaminoethyl chloride for the dimethyl compound of the preceding example.

EXAMPLE V

γ-(p-Methoxybenzyl)-γ-(2-thienyl)-N,N-dimethylpropylamine

This compound is made as described for the unsubstituted compound of Example III by substituting p-methoxybenzyl chloride for benzyl chloride of Example III.

EXAMPLE VI

γ-Phenyl-γ-(2-thiazyl)-N,N-diethylpropylamine

This compound is prepared in a manner analogous to the compound of Example II except for the substitution of β-N,N-diethylaminoethyl chloride for the dimethyl compound of Example II.

EXAMPLE VII

γ-(p-Methyl)phenyl-γ-(2-thiazyl)-N,N-dimethylpropylamine

By substituting p-methylphenylacetonitrile for phenylacetonitrile in Example II, the compound of this example is obtained.

EXAMPLE VIII

γ-(p-Chlorophenyl)-γ-(2-pyrimidyl)-N,N-dimethylpropylamine p-Chlorophenylacetonitrile is alkylated with 2-chloropyrimidine and β-N,N-dimethylethylchloride as described in Example I. The removal of the CN group is carried out with 70%–80% sulfuric acid.

EXAMPLE IX

γ-p-Isopropylphenyl-γ-(2-pyrimidyl)-N,N-dimethylpropylamine p-Isopropylacetonitrile obtained from cumene by chlormethylation and subsequent reaction with KCN is alkylated with 2-chlor-pyrimidine and the β-N,N-dimethylethyl chloride. The trisubstituted nitrile was then treated with 80% sulfuric acid as described in Example I.

EXAMPLE X

δ-Phenyl-δ-(2-pyrimidyl)-N,N-dimethyl butylamine

By substituting γ-N,N-dimethylpropyl chloride for the ethyl chloride of Example I, there results the butylamine of this example.

EXAMPLE XI

δ-Phenyl-δ-(2-pyrimidyl)-β-(dimethylamino)-butane

The requisite intermediate β-dimethylaminopropyl chloride is obtained from the corresponding alcohol by reaction with thionyl chloride. This aminoalkyl halide and 2-chloropyrimidine are reacted with phenylacetonitrile as described in Example I.

EXAMPLE XII

γ-Phenyl-γ-(2-pyrazyl)-N,N-dimethylpropylamine

The intermediate 2-chloropyrazine is obtained from the hydroxy compound by reaction with thionyl chloride. This halide plus β-N,N-dimethylaminoethyl chloride are condensed with phenylacetonitrile in accordance with the previous examples and the resulting trisubstituted nitrile then treated with 80% sulfuric acid at 140° C.

EXAMPLE XIII

*γ-Benzyl-γ-(5-bromo-2-thienyl)-N,N - dimethylpropylamine*

The compound of Example III is brominated with 1 molecular equivalent of bromine in acetic acid solution at 40–50° C. The resulting reaction mixture is diluted with water, made alkaline with gaseous ammonia, and extracted with ether. The combined ether extracts are washed with dilute sodium bicarbonate, dried, and after removing the solvent the residue is distilled.

The compounds of the invention may be used in the form of the free bases or in the form of the salts thereof with inorganic acids such as hydrochloric, hydrobromic, sulfuric and phosphoric acids and organic acids, such as salicylic, tartaric, maleic, succinic, citric and lactic acids.

The compounds may be used in a variety of forms, such as tablets for oral administration, creams for topical application, and injectible solutions. Preferably the salts of the compounds are used in the creams which may be of the usual formulations. The injectible solutions preferably comprise non-toxic salts in admixture with sodium carbonate and boric acid and are sterilized before use.

We claim:

1. γ - Phenyl - γ - (2 - pyrimidyl) - N,N - dimethylpropylamine.
2. γ - Phenyl - γ - (2 - thiazyl) - N,N - dimethylpropylamine.
3. γ - (p-Chlorophenyl) - γ - (2 - pyrimidyl) - N,N-dimethylpropylamine.
4. γ - (p-Isopropylphenyl) - γ - (2 - pyrimidyl)-N,N-dimethylpropylamine.
5. γ - Phenyl - γ - (2 - pyrazyl) - N,N - dimethylpropylamine.
6. A compound of the group consisting of bases of the general formula

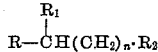

wherein R is a heterocyclic nucleus of the group consisting of pyrimidyl, thiazyl, thienyl, pyrazyl, furyl, quinolyl, s-triazyl and 1,3,4-thiadiazyl, $R_1$ is selected from the group consisting of phenyl and benzyl radicals and their lower alkyl, lower alkoxy and halogen substitution products, $R_2$ is selected from the group consisting of dialkylamino, morpholino and piperidino groups, and $n$ is an integer not less than 2 and not more than 3, and the non-toxic salts thereof with acids.

7. Compounds of the formula

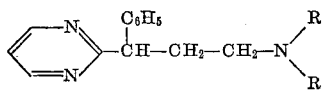

wherein R is a lower alkyl radical.

8. Compounds of the formula

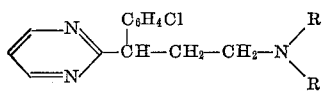

wherein R is a lower alkyl radical.

9. Compounds of the formula

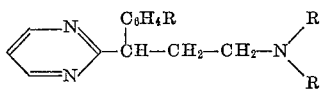

wherein R is a lower alkyl radical.

10. Compounds of the formula

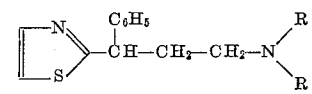

wherein R is a lower alkyl radical.

11. Compounds of the formula

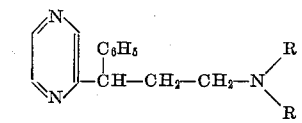

wherein R is a lower alkyl radical.

NATHAN SPERBER.
DOMENICK PAPA.
ERWIN SCHWENK.

REFERENCES CITED

The following references are of record in the file of this patent:

FOREIGN PATENTS

| Number | Country | Date |
|---|---|---|
| 883,539 | France | July 7, 1943 |

OTHER REFERENCES

Alles, J. Pharmaceutical and Experimental Therapy, 72, 265 (1941).

Richter, Textbook of Organic Chemistry (1938), pp. 649–650.

Hartman, California Medicine 66 (No. 4), 242–248 (1947).